United States Patent
Riar et al.

(10) Patent No.: US 10,742,127 B2
(45) Date of Patent: Aug. 11, 2020

(54) BATTERY INTEGRATED MODULAR MULTIFUNCTION CONVERTER FOR GRID ENERGY STORAGE SYSTEMS

(71) Applicant: Utah State Univesity, Logan, UT (US)

(72) Inventors: Baljit S. Riar, Logan, UT (US); Regan A. Zane, Hyde Park, UT (US); Prasanth Thummala, Lyngby (DK); Weilun Chen, Logan, UT (US); Muhammad Muneeb Ur Rehman, Logan, UT (US)

(73) Assignee: Utah State University, Logan, UT (US)

(*) Notice: Subject to any disclaimer, the term of this patent is extended or adjusted under 35 U.S.C. 154(b) by 147 days.

(21) Appl. No.: 16/026,767

(22) Filed: Jul. 3, 2018

(65) Prior Publication Data
US 2020/0014306 A1    Jan. 9, 2020

(51) Int. Cl.
*H02M 3/335*    (2006.01)
*H02M 7/797*    (2006.01)
*H02M 1/08*    (2006.01)
*H02J 1/08*    (2006.01)
(Continued)

(52) U.S. Cl.
CPC ....... *H02M 3/33584* (2013.01); *H02J 7/0063* (2013.01); *H02M 1/083* (2013.01); *H02M 7/797* (2013.01); *H02M 2001/0058* (2013.01)

(58) Field of Classification Search
None
See application file for complete search history.

(56) References Cited

U.S. PATENT DOCUMENTS

| | | | |
|---|---|---|---|
| 7,768,800 B2* | 8/2010 | Mazumder | H02M 5/458 363/17 |
| 2009/0196082 A1* | 8/2009 | Mazumder | H02M 5/458 363/132 |
| 2015/0048794 A1* | 2/2015 | Park | H02J 7/0016 320/118 |

OTHER PUBLICATIONS

Weilun Chen, Regan Zane, Daniel Seltzer, Luca Corradini, Isolated Bidirectional DC/AC and AC/DC Three-Phase Power Conversion using Series Resonant Converter Modules and a Three-Phase Unfolder, 2014 IEEE 15th Workshop on Control and Modeling for Power Electronics, Jun. 22-25, 2014, pp. 1-6.

(Continued)

*Primary Examiner* — Jared Fureman
*Assistant Examiner* — Aqeel H Bukhari

(57) ABSTRACT

An apparatus includes power blocks. Each power block includes converter modules. Each converter module includes a positive and a negative bidirectional converter and a battery module. The bidirectional converters are connected to the battery module and outputs are connected in parallel. Paralleled positive bidirectional converters are connected in series between a positive connection and a neutral connection and the paralleled negative bidirectional converters of each power block are connected in series between the neutral connection and a negative connection. A DC-link controller controls a positive output voltage between the positive and neutral connections to follow a positive voltage reference and controls a negative output voltage between the neutral and negative connections to follow a negative voltage reference. A state-of-charge controller controls a ratio of power supplied by each power block and a ratio of power supplied by each converter module based on a target state-of-charge for each battery module.

20 Claims, 12 Drawing Sheets

(51) Int. Cl.
  *H02J 7/00* (2006.01)
  *H02M 1/00* (2006.01)

(56) References Cited

OTHER PUBLICATIONS

W. Warren Chen, Baljit Riar, Regan Zane, A Three-Port Series Resonant Converter for Three-Phase Unfolding Inverters, 2017 IEEE 18th Workshop on Control and Modeling for Power Electronics, Jul. 9-12, 2017, pp. 1-7.

* cited by examiner

| k | $v_{PO}$ | $v_{ON}$ | $i_a$ | $i_b$ | $i_c$ |
|---|---|---|---|---|---|
| 0 | $v_{ca}$ | $v_{ab}$ | $i_B - i_T$ | $-i_B$ | $i_T$ |
| 1 | $-v_{ca}$ | $-v_{bc}$ | $i_T$ | $-i_B$ | $i_B - i_T$ |
| 2 | $v_{ab}$ | $v_{bc}$ | $i_T$ | $i_B - i_T$ | $-i_B$ |
| 3 | $-v_{ab}$ | $-v_{ca}$ | $i_B - i_T$ | $i_T$ | $-i_B$ |
| 4 | $v_{bc}$ | $v_{ca}$ | $-i_B$ | $i_T$ | $i_B - i_T$ |
| 5 | $-v_{bc}$ | $-v_{ab}$ | $-i_B$ | $i_B - i_T$ | $i_T$ |

BATTERY INTEGRATED MODULAR MULTIFUNCTION CONVERTER FOR GRID ENERGY STORAGE SYSTEMS

FIELD

This invention relates to battery charging and discharging and more particularly relates to a modular multifunction converter for battery charging and discharging as well as connection to other sources and loads.

BACKGROUND

The integration of renewable energy sources into existing alternating current ("AC") and direct current ("DC") grids is a challenge because the power output of the sources such as wind and solar is stochastic in nature, and weather dependent. A battery energy storage system is a feasible candidate for storing the variable power, and with its timescales ranging from few seconds to hours is a promising solution for the integration of distributed renewable sources and improving reliability of the grid. Battery storage technologies are, therefore, receiving significant attention and are expected to play a key role in the transformation to a low-carbon, clean energy system. Grid connected battery systems can be categorized into different levels, ranging from low voltage (kWh range) battery systems to high voltage (MWh range) battery systems. With growing energy demands, increasing the battery capacity and converter power ratings is an area of ongoing research.

In the case of energy storage applications, several battery cells are usually connected in series and parallel to form a battery pack to increase the total voltage and current of the pack. Any mismatch in a pack due to cells chemistry, component tolerances, wiring and other known asymmetries results in the voltage imbalance of series connected cells and increase in circulating currents of parallel connected cells. These asymmetries are detrimental for a battery pack resulting in decreased lifetime, poor utilization of battery capacity and poor efficiency. Additional circuits are then needed to either passively or actively manage the battery cells. Alternatively, DC-DC converters are connected to few cells and the converter outputs are connected in series and parallel as required. With a grid connected system, a two-stage approach is commonly used, where the first converter connected to a battery increases the voltage and the second converter exchange power with a grid. This two-stage approach usually requires large and bulky filters to improve the quality of the AC waveforms.

Power electronics converters are used in wide variety of applications including energy storage systems, renewable energy systems, energy conversion, and micro-grids. Because of their wide range of applications, there has been an increasing demand for converters with high efficiency, reliability, power quality and compact size.

SUMMARY

An apparatus for battery charging and discharging includes a plurality of power blocks. Each power block includes one or more converter modules. Each converter module includes a positive bidirectional converter, a negative bidirectional converter, and a battery module. A first side of the positive and negative bidirectional converters of a converter module are connected in parallel to the battery module of the converter module. A second side of the positive and negative bidirectional converters of each converter module are connected in parallel, where the paralleled positive bidirectional converters of each power block are connected in series between a positive connection and a neutral connection and where the paralleled negative bidirectional converters of each power block are connected in series between the neutral connection and a negative connection. The apparatus includes a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference. The apparatus includes a state-of-charge controller that controls a ratio of power supplied by each power block and a ratio of power supplied by each converter module within a power block based on a target state-of-charge for each battery module.

In some embodiments, the apparatus includes an unfolder connected to the positive connection, the negative connection, and the neutral connection. The unfolder provides a three-phase output and converts power from the power blocks to three-phase alternating current ("AC") output power at output terminals of the unfolder for connection to a three-phase load. In other embodiments, the DC-link controller is programmable to control the positive output voltage to produce a triangular output waveform and the negative output voltage to produce triangular output waveform, where the unfolder converts the triangular output waveforms to produce low harmonic three-phase sinusoidal output waveforms. In other embodiments, each triangular output waveform is a quasi-triangular waveform shaped to minimize harmonics of the three-phase sinusoidal output waveforms of the unfolder. In other embodiments, the unfolder is bidirectional and includes a neutral point clamp converter or a diode clamp converter.

In other embodiments, the three-phase load sinks and sources power. In other embodiments, the neutral connection of the plurality of power blocks is common with a neutral connection of the unfolder and the neutral connection is isolated from each battery module. In other embodiments, one or more loads are connected to the output terminals of the unfolder and/or the positive, neutral and negative connections and the DC-link controller determines voltage requirements of the one or more loads and selects a direct current ("DC") output voltage control scheme or an AC output voltage control scheme to match voltage requirements of the load.

In some embodiments, each battery module includes one or more battery cells connected together and the state-of-charge controller adjusts power provided by and to each battery module according to a target state-of-charge for the battery module that considers health of each battery module. In other embodiments, the battery modules are connected together to form a battery and the battery is connected to a charging circuit and/or a load.

In some embodiments, each bidirectional converter includes a bidirectional switchmode power converter, where each converter module provides electrical isolation between the battery module of the converter module and output connections of the converter module. In other embodiments, the bidirectional switchmode power converter includes one of a dual active bridge series resonant converter ("DABSRC") and a three-port series resonant converter ("3PSRC"). In other embodiments, each DABSRC or 3PSRC operates in a zero-voltage switching ("ZVS") mode.

In some embodiments, the DC-link controller is programmable to control the positive output voltage to a constant voltage and to control the negative output voltage to a constant voltage, where the positive connection, neutral connection and negative connection feed a DC load. In other embodiments, the output voltages of a power block of the plurality of power blocks differ from the output voltages of other power blocks of the plurality of power blocks.

Another apparatus for battery charging and discharging includes a plurality of power blocks. Each power block includes one or more converter modules. Each converter module includes a positive bidirectional converter, a negative bidirectional converter, and a battery module. A first side of the positive and negative bidirectional converters of a converter module are connected in parallel to the battery module of the converter module. A second side of the positive and negative bidirectional converters of each converter module are connected in parallel, where the paralleled positive bidirectional converters of each power block are connected in series between a positive connection and a neutral connection and where the paralleled negative bidirectional converters of each power block are connected in series between the neutral connection and a negative connection.

The apparatus includes a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference. The apparatus includes a state-of-charge controller that controls a ratio of power supplied by each power block and a ratio of power supplied by each converter module within a power block based on a target state-of-charge for each battery module. The apparatus includes an unfolder connected to the positive connection, the negative connection, and the neutral connection. The unfolder provides a three-phase output and converts power from the power blocks to three-phase alternating current ("AC") output power at output terminals of the unfolder for connection to a three-phase load. The DC-link controller is programmable to control the positive output voltage to produce a triangular output waveform and the negative output voltage to produce triangular output waveform usable by the unfolder to produce three-phase output power for a load connected to the unfolder, and the DC-link controller is programmable to control the positive output voltage and the negative output voltage to voltages suitable for a load connected to the positive, negative and neutral connections.

In some embodiments, when the DC-link controller is programmed for a load connected to the positive, negative and neutral connections, an unfolder controller adapts control of switches of the unfolder to produce three-phase output power to a load connected to the unfolder. In other embodiments, each battery module includes one or more battery cells connected together and where the state-of-charge controller adjusts power provided by and to each battery module according to a target state-of-charge for the battery module that considers health of each battery module. In other embodiments, each bidirectional converter includes one of a dual active bridge series resonant converter ("DABSRC") and a three-port series resonant converter ("3PSRC") and where each converter module provides electrical isolation between the battery module of the converter module and output connections of the converter module.

Another apparatus for battery charging and discharging includes a plurality of power blocks. Each power block includes one or more converter modules. Each converter module includes a positive bidirectional converter, a negative bidirectional converter, and a battery module. Each bidirectional converter includes a dual active bridge series resonant converter ("DABSRC"). A first side of the positive and negative bidirectional converters of a converter module are connected in parallel to the battery module of the converter module. A second side of the positive and negative bidirectional converters of each converter module are connected in parallel, where the paralleled positive bidirectional converters of each power block are connected in series between a positive connection and a neutral connection and where the paralleled negative bidirectional converters of each power block are connected in series between the neutral connection and a negative connection. The apparatus includes a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference.

The apparatus includes a state-of-charge controller that controls a ratio of power supplied by each power block and a ratio of power supplied by each converter module within a power block based on a target state-of-charge for each battery module. The apparatus includes an unfolder connected to the positive connection, the negative connection, and the neutral connection. The unfolder provides a three-phase output and converts power from the power blocks to three-phase AC output power at output terminals of the unfolder for connection to a three-phase load. The DC-link controller is programmable to control the positive output voltage to produce a triangular output waveform and the negative output voltage to produce triangular output waveform usable by the unfolder to produce three-phase output power for a load connected to the unfolder. Each battery module includes one or more battery cells, where the one or more battery cells of a battery module are connected together and where each converter module provides electrical isolation between the battery module of the converter module and output connections of the converter module.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
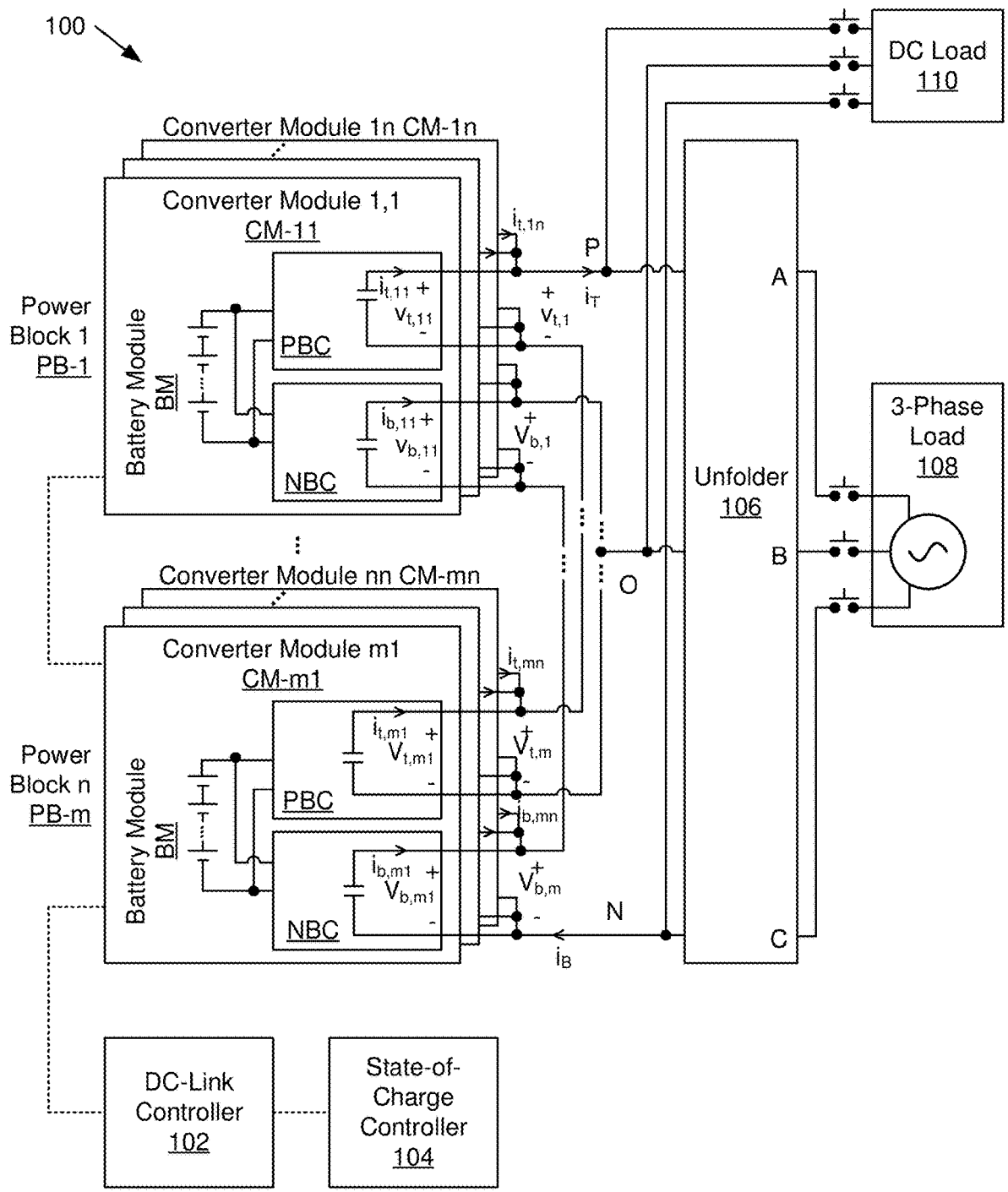
FIG. 1 is a schematic block diagram illustrating one embodiment of a modular battery apparatus.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium is non-transitory and may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a multifunction converter, partly on the multifunction converter, as a stand-alone software package, partly on the multifunction converter and partly on a remote computer or entirely on the remote computer or server. In the latter scenario, the remote computer may be connected to the multifunction converter through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose processor, special purpose processor, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a multifunction converter, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a controller, other programmable data processing apparatus, or other device to cause a series of operational steps to be performed on the controller, other programmable apparatus or other device to produce a computer implemented process, such that the instructions which execute on the controller, other programmable apparatus, or other device implement the functions/acts specified in the flowchart and/or block diagram block or blocks.

FIG. 1 is a schematic block diagram illustrating one embodiment of a modular battery apparatus 100. In one embodiment, the modular battery apparatus 100 is a battery integrated modular multifunction converter ("MMFC"). The MMFC apparatus 100 includes a plurality of power blocks PB-1 to PB-m. Each power block PB includes one or more converter modules CM (CM-11, CM-12, . . . CM-1$n$ for PB-1, CM-21, CM-22, . . . CM-2$n$ for PB-2, CM-m1, CM-m2, CM-mn for PB-m). Each converter module CM includes a positive bidirectional converter PBC, a negative bidirectional converter NBC, and a battery module BM. This series and parallel combination reduces voltage and current rating of each CM. In one embodiment, the bidirectional converters BC provide electrical isolation between the battery modules BM and the DC-link voltages $V_{PO}$, $V_{ON}$.

Each battery module BM may include one or more connected battery cells. For example, the battery cells may be connected in series. In another example, the battery cells are connected in parallel. In another embodiment, some battery cells may be connected in parallel to form battery groups and the battery groups may be then connected in series. One of skill in the art will recognize other ways to connect battery cells to form a battery module BM.

In some embodiments, the battery modules BM are connected together to form a battery and the battery is connected to a charging circuit and/or a load. The battery may connect to a high voltage load relative to the DC load 110. For example, the high voltage load may be motor, such as for a vehicle while the DC load 110 may include other electronics at a lower voltage. In other embodiments, a battery charger is connected to the battery. In other embodiments, battery charging is through the DC load 110 or the 3-phase load 108. The battery modules BM may be different voltages, different health levels, etc., as will be explained in more detail below.

Each bidirectional converter BC, in some embodiments, is a power electronics device that uses switching devices to convert a DC voltage of a connected battery module BM to a different voltage. In a bidirectional converter BC may include any topology suitable for converting voltage of a battery module BM to another voltage. In one embodiment, a bidirectional converter BC may be a dual active bridge series resonant converter ("DABSRC"). In another embodiment, the bidirectional converter BC may be another resonant topology, a boost-derived topology, a buck-derived topology, and the like. The bidirectional converter BC, in some embodiments, is capable of charging and discharging the attached battery module BM. One of skill in the art will recognize other topologies suitable for a bidirectional converter BC.

A first side of each of the positive and negative bidirectional converters PBC, NBC of a converter module CM is connected in parallel to the battery module BM of the converter module CM. Where the positive and negative bidirectional converters PBC, NBC are identical, a single battery module BM can be used to provide symmetrical positive and negative DC-link voltages (e.g. $V_{PO}$, $V_{ON}$), which may be advantageous to produce balanced three-phase voltages from the unfolder 106.

A second side of each of the positive and negative bidirectional converters PBC, NBC of each converter module CM is connected in parallel, as depicted in FIG. 1. The paralleled positive bidirectional converters PBC of each power block PB are connected in series between a positive connection P and a neutral connection O and the paralleled negative bidirectional converters NBC of each power block PB are connected in series between the neutral connection O and a negative connection N. By connecting the outputs of the positive bidirectional converters PBC in series and connecting the negative bidirectional converters NBC in series, different battery modules BM may be used so that battery modules BM of different voltages, different health levels, etc. can contribute to the positive and negative DC-link voltages.

Where the positive bidirectional converters PBC are each connected in series, the current $i_T$ through the positive bidirectional converters PBC is the same through each positive bidirectional converter PBC. Likewise, where the negative bidirectional converters NBC are each connected in series, the current $i_B$ through the negative bidirectional converters NBC is the same through each negative bidirectional converter NBC. Where the DC-link voltages $V_{PO}$, $V_{ON}$ are controlled to a reference value, power from or to the battery modules BM of each power block PB are different based on the voltages contributed by each converter module CM toward the controlled DC-Link voltages $V_{PO}$, $V_{ON}$. Thus, if a positive DC-link voltage VPO is 200 volts ("V") and the MMFC apparatus 100 has two power blocks (e.g. PB-1, PB-2), the converter modules CM (e.g. CM-11 ... CM-1n) of the first power block PB-1 may produce 50 V from each bidirectional converter PBC, NBC and the converter modules CM (e.g. CM-21 ... CM-2n) of the second power block PB-2 may produce 150 V from each bidirectional converter PBC, NBC. The voltage ratio between the power blocks PB may vary as a function of state-of-charge ("SOC"), health, etc. of the battery modules BM of the power blocks PB-1, PB-2.

Likewise, within a single power block (e.g. PB-1), the converter modules CM-11 ... CM-1n) can provide different amounts of current that contribute to the total DC-link currents $i_T$, $i_B$. Thus, the state of charge, batter module health, etc. can be used to vary the current from each converter module CM-11 ... CM-1n of a power block PB-1.

The MMFC apparatus 100 includes a DC-link controller 102 that controls, by varying current through the plurality of power blocks PB-1 to PB-m, a positive output voltage between the positive connection P and the neutral connection O to follow a positive voltage reference and controls a negative output voltage between the neutral connection O and the negative connection N to follow a negative voltage reference. Typically, the positive output voltage and negative output voltage are symmetrical, which helps in providing a balanced 3-phase output of the unfolder 106.

The MMFC apparatus 100 includes a state-of-charge controller 104 that controls a ratio of power supplied by each power block PB and a ratio of power supplied by each converter module CM within a power block PB based on a target state-of-charge for each battery module BM. The state-of-charge controller 104, in one embodiment, controls the voltages (e.g. $v_{t,11}, \ldots v_{t,1n}, \ldots v_{t,n1}, \ldots v_{t,mn}$, $v_{b,11}, \ldots v_{b,1n}, \ldots v_{b,n1}, \ldots v_{b,mn}$) of the converter modules CM-11 ... CM-mn that contribute to the positive and negative DC-link voltages $V_{PO}$, $V_{NO}$ commanded by the DC-link controller 102, which contributes to state-of-charge, battery health, etc. of the batter modules BM of the MMFC apparatus 100. In another embodiment, the state-of-charge controller 104 controls currents (e.g. $i_{t,11} \ldots i_{t,1n}$, $i_{b,11} \ldots i_{b,1n}$) of the converter modules (e.g. CM-11 ... CM-1n) of a power block (e.g. PB-1) to control state-of-charge, battery health, etc. of the battery modules BM of the power block PB-1.

In some embodiments, the MMFC apparatus 100 includes an unfolder 106 connected to the positive connection P, the negative connection O, and the neutral connection N. The unfolder provides a three-phase output and converts power from the power blocks PB to three-phase AC output power at output terminals A, B, C of the unfolder 106 for connection to a three-phase load 108. The unfolder 106 may produce 208 V 3-phase, 3-wire power, 120/208 V, 3-phase, 4-wire power, 480 V 3-phase, 3-wire power, 277/480 V, 3-phase, 4-wire power, which are common in the United States, or may provide other 3-phase, 3 or 4 wire power at different voltages. The three-phase load 108, in one embodiment, sinks and sources power. In another embodiment, the three-phase load 108 is a 3-phase power grid that includes one or more power sources and one or more loads. For example, the three-phase load 108 may be a utility grid, a power grid for a building, etc.

In another embodiment, the unfolder 106 provides single-phase, 2 or 3-wire power, such as 120/240 V, 3-wire power, 120 V, 2-wire power, 240 V, 2-wire power or other voltage with 2 or 3 wire solutions. One of skill in the art will recognize other outputs for an unfolder 106 that utilize controlled DC-link voltages $V_{PO}$, $V_{ON}$.

In other embodiments, the MMFC apparatus 100 includes a DC load 110, which connects directly to the DC link connections P, O, N. The DC load 110 may be a DC power grid, a DC load, a DC power source and may sink or source power.

In some embodiments, the DC-link controller 102 is programmable to control the positive output voltage $V_{PO}$ to produce a triangular output waveform and the negative output voltage $V_{ON}$ to produce triangular output waveform. The unfolder 106 converts the triangular output waveforms to produce low harmonic three-phase sinusoidal output waveforms. In some embodiments, each triangular output waveform is a quasi-triangular waveform shaped to minimize harmonics of the three-phase sinusoidal output waveforms of the unfolder 106. The quasi-triangular waveforms are described in more detail below.

In some embodiments, the MMFC apparatus 100 may be connected to one or more 3-phase loads 108 and/or one or more DC loads 110 and the DC-link controller 102 determines voltage requirements of the one or more 3-phase loads 108 and/or DC loads 110 and selects a DC output voltage control scheme or an AC output voltage control scheme to match voltage requirements of the loads 108, 110. For example, the DC-link controller 102 may determine that there is a DC load 110 in addition to the 3-phase load 108 and my control the DC link voltages $V_{PO}$, $V_{ON}$ to fixed DC voltages and the unfolder 106 converts the DC voltages to 3-phase power. However, in this condition the 3-phase power may have more harmonics than when the DC-link controller controls the DC-link voltages $V_{PO}$, $V_{ON}$ to quasi-triangular waveforms. In other embodiments, the DC-link controller 102 may detect that the DC load 110 is not active, is disconnected, or not present and may then detect a 3-phase load 108 and may control the power blocks PB-1 to provide quasi-triangular waveforms at the input terminals P, O, N of the unfolder 106. In another embodiment, the DC load 110 includes filtering and the DC-link controller 102 controls the power blocks PB-1 to provide quasi-triangular waveforms at the input terminals P, O, N of the unfolder 106.

To alleviate previously mentioned disadvantages of the existing converter technologies, the MMFC apparatus 100 shown in FIG. 1 is proposed for grid energy storage systems and other uses. A typical large battery pack is replaced with smaller battery modules (BMs) that are integrated into the converter topology. This modular architecture, therefore, provides several functions, including better utilization of battery capacity over its lifetime, increased energy storage, and functions that are inherent to typical grid connected converters.

In one embodiment, the switching frequency of the bidirectional converter BC is much higher than a fundamental frequency of the 3-phase power of the unfolder 106 and a quasi-triangular waveform of the DC-link. For example, where the fundamental frequency is 50 hertz ("Hz"), 60 Hz, 400 Hz, etc., the switching frequency may be more than 50-100 times the fundamental frequency of the 3-phase power. In one embodiment, the switching frequency is 50 kHz or more. In another embodiment, the switching frequency is around 100 kHz. In some embodiments, the switching frequency is chosen so that a varying frequency at the output of the bidirectional converter BC is low compared to the switching frequency.

For example, where the output of the bidirectional converter BC is commanded to be a triangular waveform, a quasi-triangular waveform, etc. with a frequency suitable for the unfolder 106 to provide 3-phase or single-phase power for a grid, the triangular or quasi-triangular waveform may be relatively slow moving for the bidirectional converter BC so that a response time of the bidirectional converter BC is fast compared to variations in the DC-link voltages $V_{PO}$, $V_{ON}$. Thus, even varying DC-link voltages may appear as a near DC voltage to the bidirectional converter BC. One of skill in the art will recognize an appropriate switching voltage for the bidirectional converter BC.

Figure 2A:
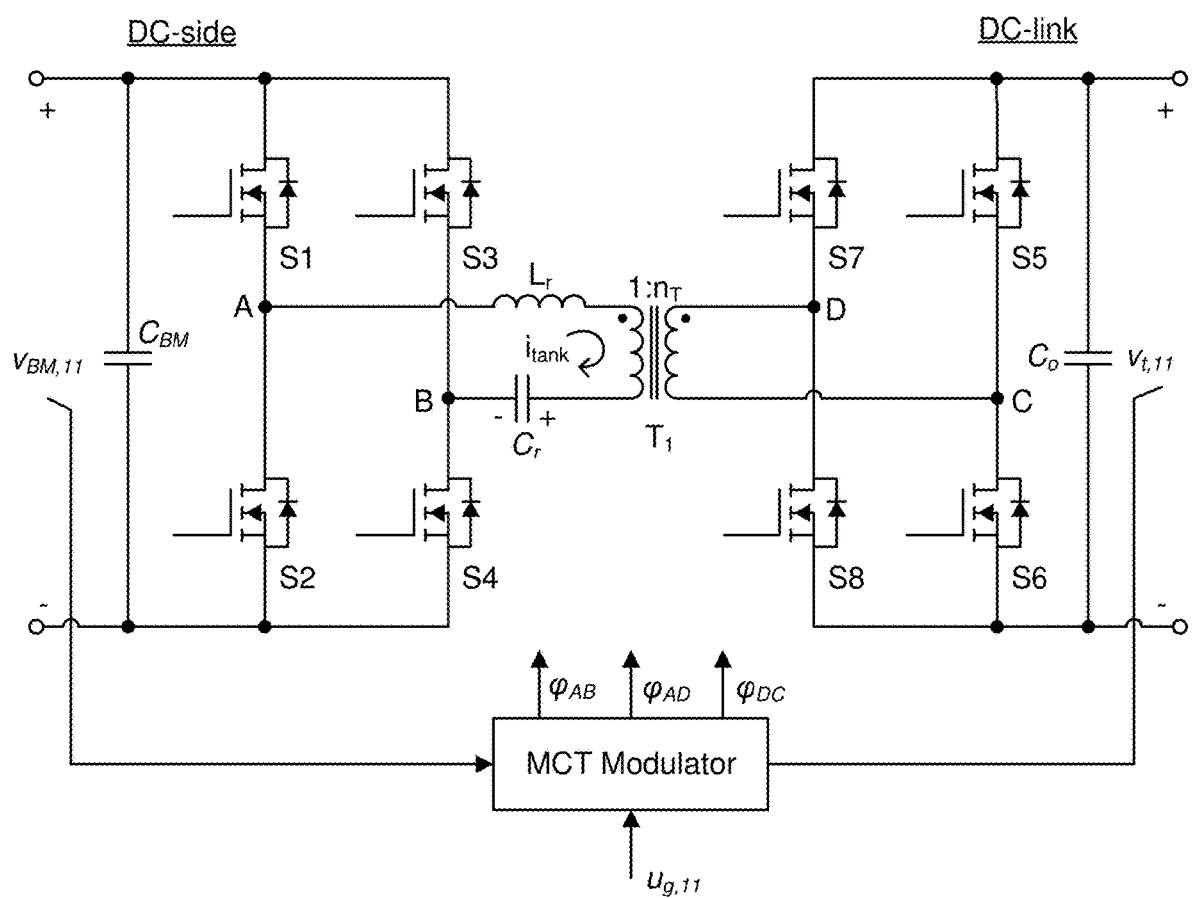
FIG. 2A is a schematic block diagram illustrating one embodiment of a bidirectional converter in the form of a dual active bridge series resonant converter.

FIG. 2A is a schematic block diagram illustrating one embodiment of a bidirectional converter BC in the form of a dual active bridge series resonant converter ("DABSRC"). The DABSRC, in one embodiment, includes a positive power regulation module within an MCT modulator that controls output power of the DABSRC to a positive power reference over a positive constant power range between the output voltage of the DABSRC being at the output voltage reference and output current of the DABSRC being at a positive output current reference. The MCT modulator, in some embodiments, includes a negative power regulation module that controls output power of the DABSRC to a negative power reference over a constant power range between output voltage of the DABSRC being at the output voltage reference and a maximum negative power limit of the DABSRC, and a constant current module that limits output current to a positive output current reference in a range between a minimum output voltage and output power of the DABSRC reaching the positive power reference.

In some embodiments, the constant current module includes a current feedback control loop that limits output current to below the positive output current reference. In another embodiment, the positive power regulation module, the negative power regulation module, and the voltage regulation module include feedback control loops and the current feedback control loop includes an inner feedback control loop and the feedback control loops of the positive power regulation module, the negative power regulation module, and the voltage regulation module form an outer feedback loop. In another embodiment, the constant current feedback loop further includes compensation implemented using a gain scheduled feedback controller. The gain scheduled feedback controller includes one or more output control signals that vary over a plurality of control regions, where the gain scheduled feedback controller implements a different compensation equation for each control region.

In one embodiment, the MCT modulator includes one or more phase shift modulators controlled by the one or more output control signals, where the one or more output control signals control according to a minimum current trajectory ("MCT") control technique. In some embodiments, the phase shift modulators output variables $\varphi_{AB}$, $\varphi_{AD}$, $\varphi_{DC}$, as depicted in FIG. 2A. In some embodiments, the MCT substantially minimizes circulating current within the DABSRC. In another embodiment, a gain scheduled feedback controller maintains the DABSRC in a zero-voltage switching ("ZVS") region while minimizing circulating current by following a trajectory a fixed distance from an MCT. In another embodiment, a constant current module within the MCT modulator further limits output current to a negative output current reference in a range between a minimum output voltage and output power of the DABSRC reaching the negative power reference.

In one embodiment, the output voltage reference varies with output current such that the output voltage reference decreases as output current increases. In another embodiment, the output voltage reference varies based on the equation:

$$V_{Set}(I_O) = V_{Set}(0) - I_{OUT} R_V$$

where:
$V_{Set}(I_O)$ is the output voltage reference as a function of output current;
$V_{Set}(0)$ is the output voltage reference at zero output current;
$R_V$ is a resistance representing a slope of the output voltage reference; and
$I_{OUT}$ is output current of the DABSRC.

In another embodiment, the positive output current reference varies with output voltage such that the positive output current reference decreases as output voltage increases. In a further embodiment, the positive output current reference varies based on the equation:

$$I_{Set}(V_{OUT}) = I_{Set}(0) - \frac{V_{OUT}}{R_I}$$

where:
$I_{Set}(V_{OUT})$ is the positive output current reference as a function of output voltage;
$I_{Set}(0)$ is the positive output current reference at zero output voltage;
$V_{OUT}$ is the output voltage; and
$R_1$ is a resistance representing a slope of the positive output current reference.

The DABSRC is described in more detail in U.S. Pat. No. 9,584,029, issued Feb. 28, 2017, which is incorporated herein by reference for all purposes. In one embodiment, the MCT modulator of each DABSRC receives an input signal (e.g. $u_{g,11}, \ldots u_{g,1n}, \ldots u_{g,m1}, \ldots u_{g,mn}$ for the various converter modules CM-11 to CM-mn), which controls output voltage (e.g. $v_{t,11}$ for CM-11) of the DABSRC to provide appropriate power based on a particular battery voltage (e.g. $V_{BM,11}$ for CM-11). The output variables of the phase shift modulators output variables $\varphi_{AB}$, $\varphi_{AD}$, $\varphi_{DC}$ control the switches S1-S8. The inductance $L_r$ and capacitance $C_r$ form a resonant tank and the transformer $T_1$ provides isolation between the connected battery module BM and the output of the DABSRC. The capacitors $C_{BM}$ and $C_O$ provide some filtering.

Figure 2B:
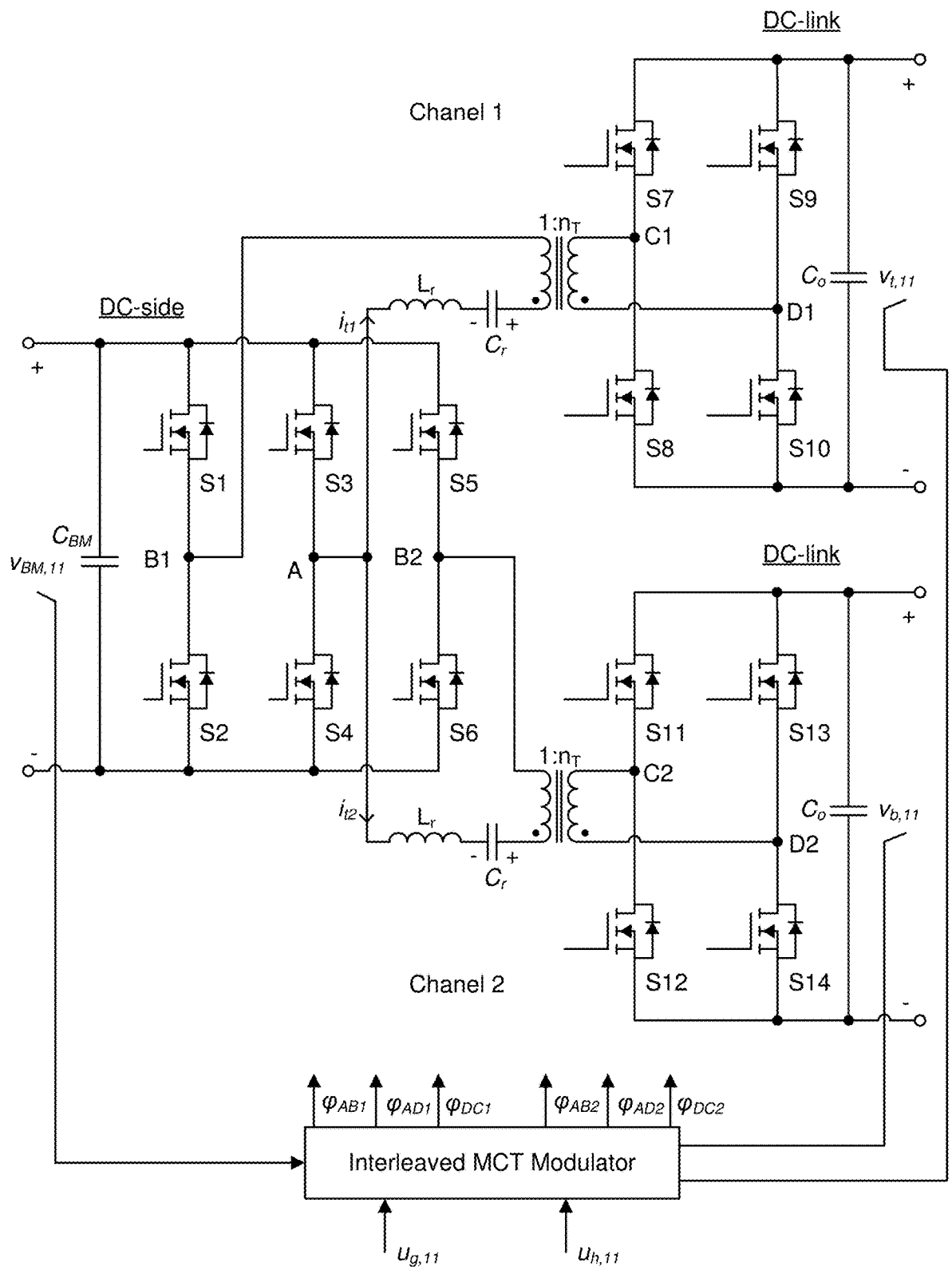
FIG. 2B is a schematic block diagram illustrating another embodiment of a bidirectional converter in the form of a three-port series resonant converter.

FIG. 2B is a schematic block diagram illustrating another embodiment of a bidirectional converter in the form of a three-port series resonant converter ("3PSRC") topology, which is derived from the existing input-parallel DBSRCs of FIG. 2A. In the DBSRC topology, the primary-side tank voltage of the first DBSRC $v_{AB1}$ is controlled by modulating the angle $\varphi_{AB1}$ between legs A1 and B1. Similarly, $v_{AB2}$ is controlled from $\varphi_{AB2}$ between legs A2 and B2. The new topology combines both legs A1 and A2 into a single leg A. The same tank voltages ($v_{AB1}$ and $v_{AB2}$) are obtained by keeping the angles between legs A and B1 and between legs A and B2 unchanged at $\varphi_{AB1}$ and $\varphi_{AB2}$. The two output ports and related circuits are unchanged.

An advantage over the existing topology is the reduction of one switch leg. Four out of seven legs in the proposed topology form a converter half (CH) and is controlled similar to a DBSRC. Legs A, B1, D1 and C1 form the first half and are controlled with angles $\varphi_{AB1}$, $\varphi_{AD1}$ and $\varphi_{DC1}$. Legs A, B2, D2 and C2 form the second half and are controlled with angles $\varphi_{AB2}$, $\varphi_{AD2}$ and $\varphi_{DC2}$. The degrees of freedom in control are unaffected. Three control angles are generated using MCT and control power flow between the input and each output port. It is of interest to determine the current in leg A, as it is shared by both converter halves and carries the sum of both tank currents $$I_A = I_{t1} + I_{t2} \qquad (1)$$

The magnitude of the combined current will depend on that of each tank current and their respective angles. Consider the previously discussed operating point where both converter halves operate at M=0.6 and U=0.4. When both halves are modulated on the γ+ or γ− trajectory, their tank currents are in-phase. Their magnitudes add up to that of the combined current $$|I_A| = |I_{t1}| + |I_{t2}|. \qquad (2)$$

Consider another case where one converter half operates on γ+ and the other half operates on γ−, their tank currents are then out-of-phase. Magnitude of the combined current will be reduced $$|I_A| < |I_{t1}| + |I_{t2}|. \qquad (3)$$

The tank phasors at M=0.6 and U=0.4 with CH1 modulated on γ+ and CH2 modulated on γ− are illustrated in FIG. 14. The combined current is reduced by about 35% over the sum of the tank currents in the non-interleaved case. This control of each converter half using different trajectory branches is referred as interleaved MCT control. It typically reduces current stress in leg A and is the preferred method of controlling the proposed topology. As the converter halves typically operate at different M and U when they are used with a three-phase unfolder, the performance of the proposed 3PSRC using interleaved MCT control requires careful evaluation.

Both theoretical analysis and computer simulation were carried out, and the results were compared with using non-interleaved MCT control. A 3PSRC-unfolding converter was designed for nominal ratings of 1 kVA, 450 V input and 370 V rms line-to-line voltages. The 3PSRC was designed using same parameters as for a DBSRC unfolding converter with $M_{pk}$=1 and $U_{pk}$=0.5. This results in a transformer turns ratio of n=1, tank inductance of $L_r$=200 µH and tank capacitance of $C_r$=34 nF, using a switching frequency of 100 kHz. A full switching model of the designed converter is simulated using the PLECS® simulation platform.

Figure 13:
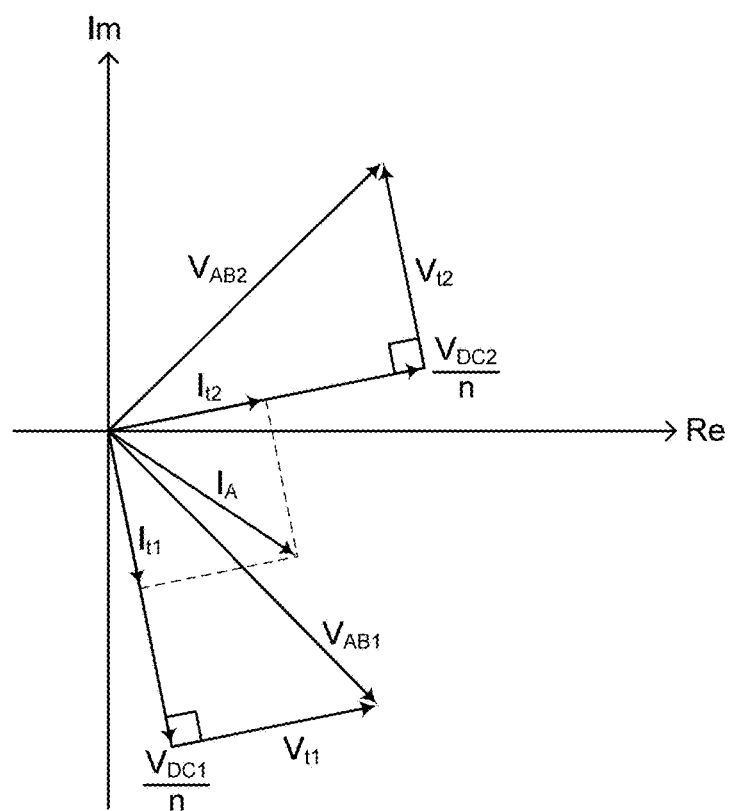
FIG. 13 is a phasor diagram with CH1 controlled on the γ+ branch, and with CH2 at the same operating point and controlled on the γ-branch.

The converter was first simulated at unity power factor. Interleaved MCT control was used, where CH1 is controlled on γ+, and CH2 on γ−. The two tank currents were phase-shifted by 83°, as expected from the phasor diagrams at the same operating point in FIG. 13. The rms current per switching period of leg A was 2.9 A, which was 28% lower than the sum of the tank currents of 4 A in the non-interleaved case. The percentage reduction matches with analytical results from FIG. 13 and demonstrates the effectiveness of interleaved control at this operating point.

Further analysis and simulation were performed on the designed converter at non-unity power factors to quantify the benefits of interleaved MCT control in the proposed 3PSRC. The rms current per line period of leg A was obtained using both interleaved and non-interleaved control (both CH1 and CH2 controlled on γ−). The results show the largest rms current reduction of up to 20% close to unity power factors. Interleaved control also results in reduced input capacitor rms current, by up to 40%. Interleaved control produces increased rms currents at around zero power factor, but the converter typically rarely operates there. In summary, use of interleaved control in the 3PSRC-unfolding converter is justified as it reduces conduction loss and capacitor size due to reduced rms currents.

Preliminary experiments were conducted on two DBSRC modules to validate control-to-output characteristics and phase difference between tank currents using different MCT branches. Each DBSRC was switched at 100 kHz and had the same tank design of n=1, $L_r$=200 µH and $C_r$=34 nF used in simulation. Inputs of the two DBSRC modules were parallel connected to a 450-V dc source. Their outputs were parallel connected to a 270-V DC load. The input and output voltages were selected to operate both converters at M=0.6, while the same U=0.4 was applied to both. DBSRC1 was operated on γ+, while DBSRC2 was on γ−. Their tank currents had similar shape and rms values when compared to simulation results at the same operating point. Their output currents had equal values of 1.8 A, which confirms operation symmetry between γ+ and γ− branches. The phase difference between the two tank currents is 53°, which is less than the 83° in simulation. The discrepancy is likely due to unaccounted tank parasitics in the experiment.

Figure 3:
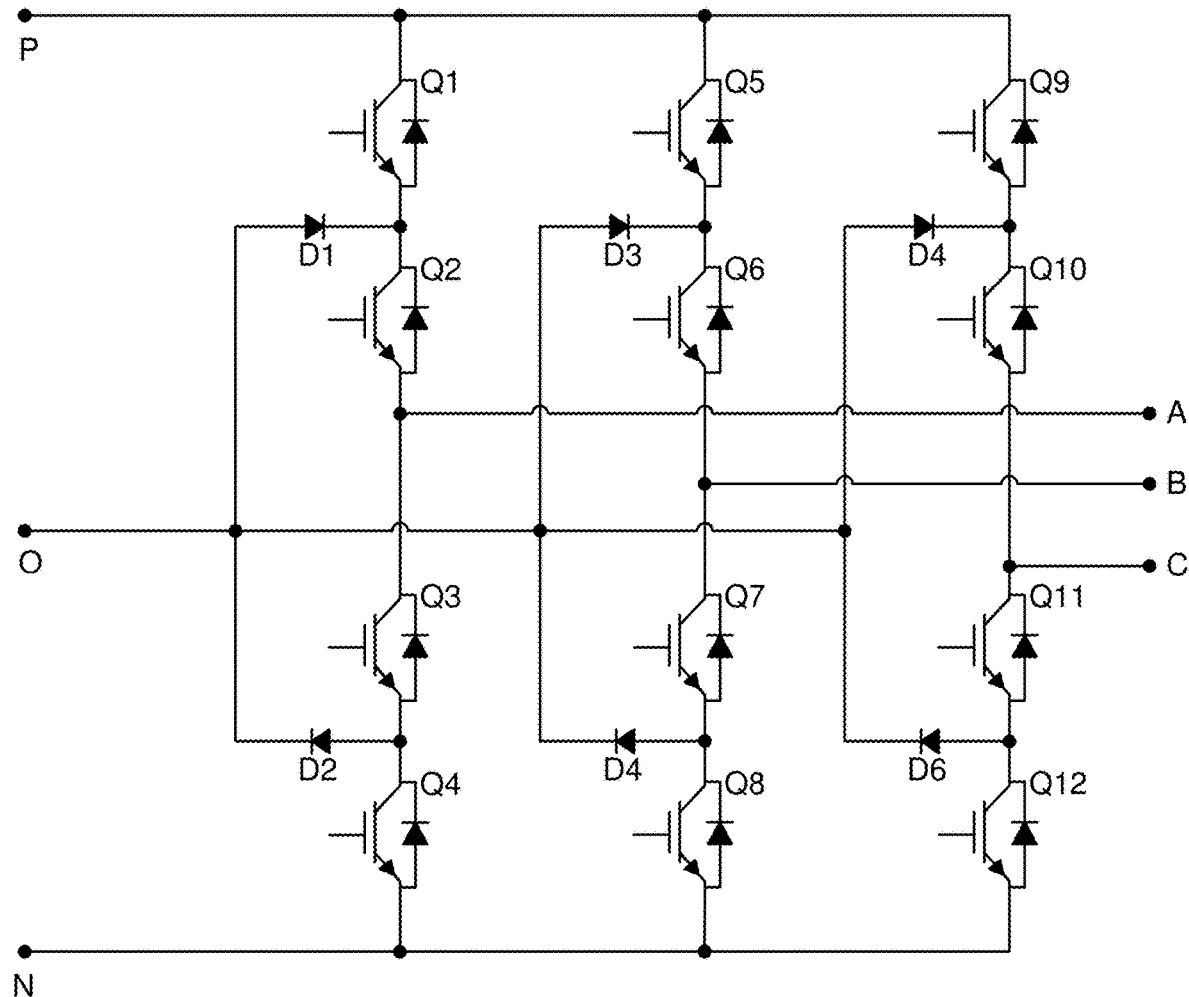
FIG. 3 is a schematic block diagram illustrating one embodiment of an unfolder.

FIG. 3 is a schematic block diagram illustrating one embodiment of an unfolder 106. In some embodiments, the unfolder 106 is bidirectional. The unfolder 106 is a three-level neutral point clamped topology. In another embodiment, the unfolder 106 is a diode clamp converter. The unfolder 106 may include any topology that converts DC-link voltages $V_{PO}$, $V_{ON}$ to 3-phase or single-phase power, including time-varying DC-link voltages. In some embodiments, the unfolder 106 is controlled using a switching sequence generated from 60-degree sectors identified in the grid voltages. The DC-link voltages $V_{PO}$, $V_{ON}$ are rectified from line voltages and may vary at a third harmonic frequency. The applied sequence typically results in negligible switching loss but is unable to control the phase currents, $i_a$, $i_b$, $i_c$. Instead, the phase currents $i_a$, $i_b$, $i_c$ are shaped using the converter modules CM by outputting DC-link currents $i_T$ and $i_B$ of appropriate profiles. The unfolder 106 may obtain sinusoidal phase currents at various power factors.

The unfolder 106 includes switches Q1-Q12, which are depicted as p-type MOSFETs and diodes D1-D6. In some embodiments, the unfolder 106 includes filtering components, snubbing components, etc. The unfolder 106 includes a controller (not shown) that controls a switching sequence for the switches Q1-Q12.

Figure 4:
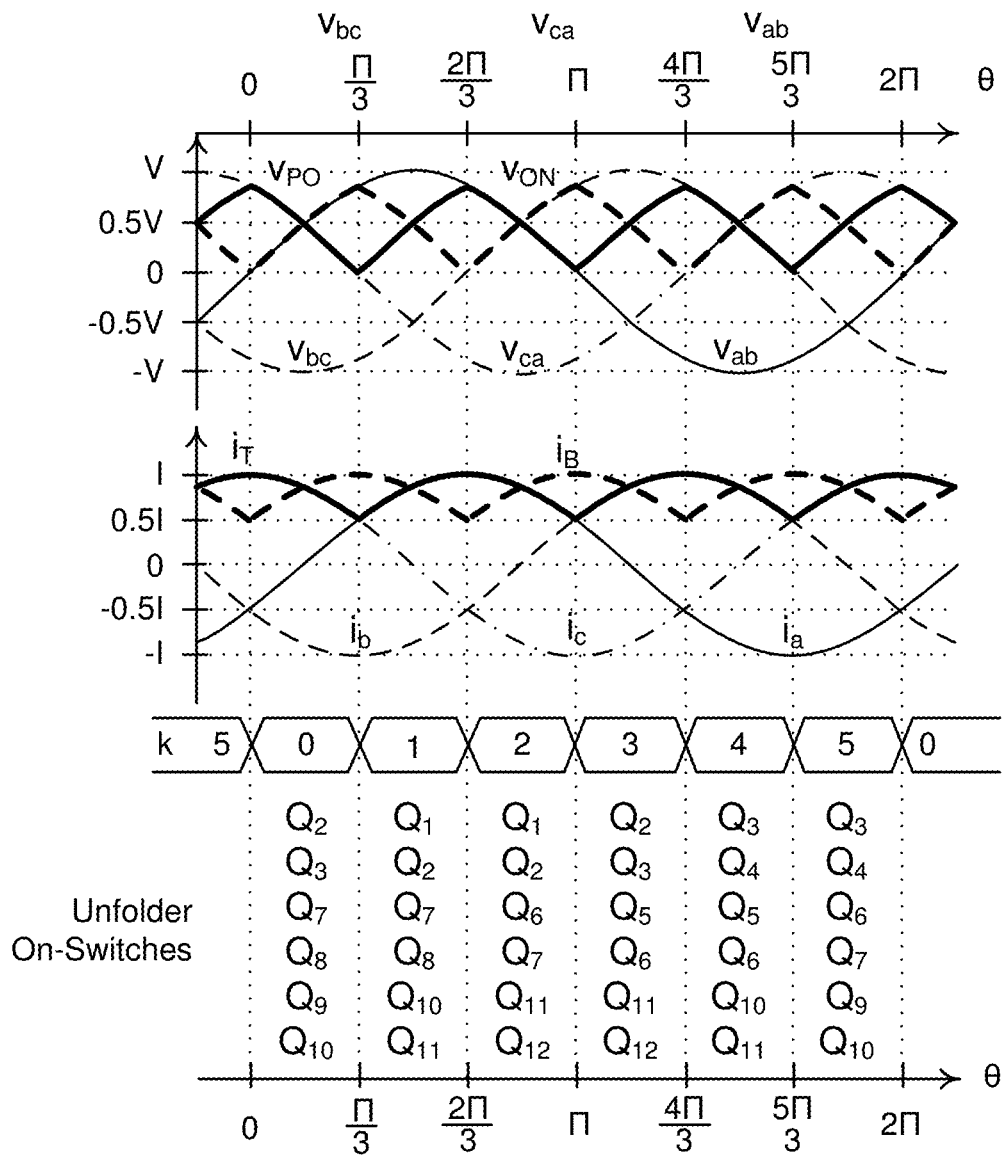
FIG. 4 are ideal three-phase alternating current ("AC") voltage waveforms and direct current ("DC") link voltage waveforms and unfolder switch states.
Figures 5, 6:
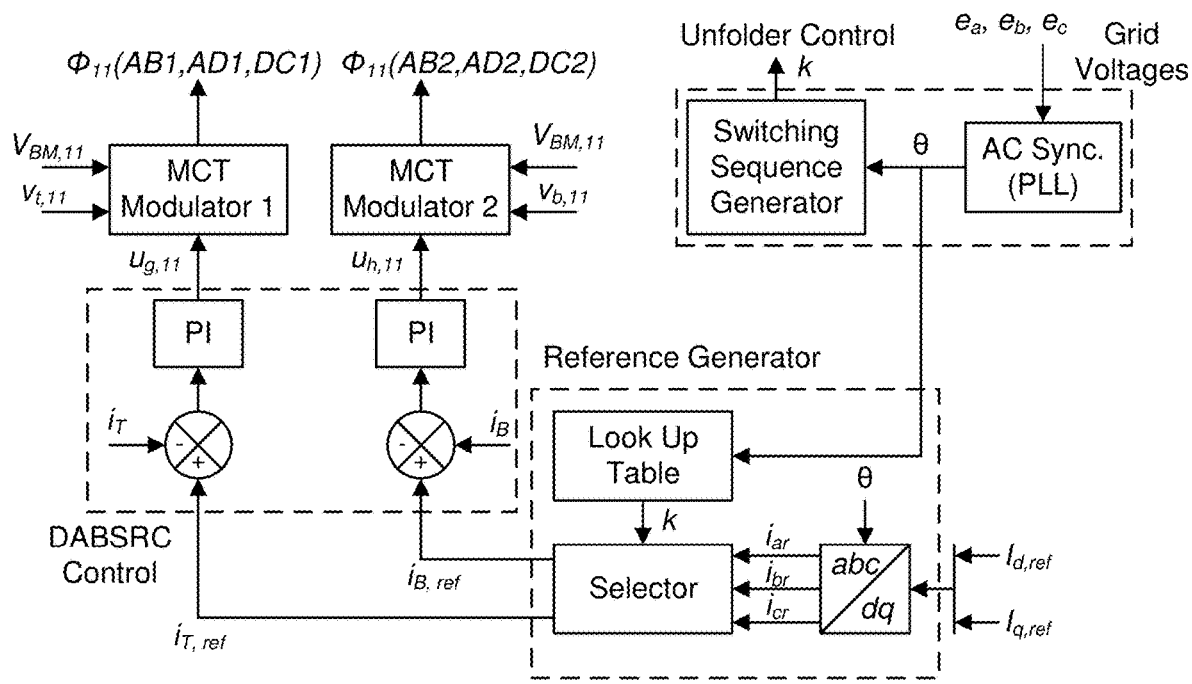
FIG. 5 is a table with unfolder AC and DC-link relationships.
FIG. 6 is a schematic block diagram illustrating one embodiment of a controller for an unfolder and converter modules.

FIG. 4 are ideal three-phase AC voltage waveforms $v_{ab}$, $v_{bc}$, $v_{ca}$ and direct current DC link voltage waveforms $v_{PO}$, $v_{ON}$ and unfolder switch states. The unfolder 106 reconstructs the 60° sine-wave segments present at the time-varying DC-link nodes P, O, N into the three-phase AC voltages $v_{ab}$, $v_{bc}$, $v_{ca}$ and vice versa. The time varying DC-link voltages $v_{PO}$, $v_{ON}$ are superimposed on the line-line voltages $v_{ab}$, $v_{bc}$, $v_{ca}$ shown in FIG. 4. DC-link currents $i_T$, $i_B$ are superimposed on the phase currents $i_a$, $i_b$, $i_c$. The switching sequence of the unfolder 106 is controlled by a six segment variable, k, that is based on the angle, $\theta=\omega t$, where $\omega$ is the angular frequency of the grid voltage. FIG. 5 shows relationship in between the unfolder DC-link voltages $v_{PO}$, $v_{ON}$ and currents $i_T$, $i_B$, and grid line-line voltages $v_{ab}$, $v_{bc}$, $v_{ca}$ and phase currents $i_a$, $i_b$, $i_c$ in the $k^{th}$ segment, or for $$\frac{k\pi}{3} \leq \theta \leq \frac{(k+1)\pi}{3}.$$

FIG. 6 is a schematic block diagram illustrating one embodiment of a controller for an unfolder 106 and a single converter module CM. The phase current references in dq frame are transformed to abc frame using inverse Park's transformation. These current references are transformed into DC link current references, $i_{T,ref}$ and $i_{B,ref}$ using FIG. 5, and a proportional-integral (PI) controller compensates for the error in between actual and reference currents. The output of the PI controller is sent to each MCT regulating the output current of a DABSRC. A similar control scheme may be used for other topologies of bidirectional converters BC. An unfolder switch sequence, shown in FIG. 4, then synthesizes AC currents. This scheme yields DC-link current $i_T$, $i_B$ and voltage waveforms $v_{PO}$, $v_{ON}$ with very small level of distortions. Consequently, phase currents $i_a$, $i_b$, $i_c$ and voltages $v_{ab}$, $v^{bc}$, $v_{ca}$ have very low THD values.

The MMFC apparatus 100 of FIG. 1 includes control of series and parallel connected converter modules CM with battery modules BM. With the control scheme described above, each battery module BM will be better managed resulting in similar SOC of all the battery cells of the battery modules BM and improved life. The approach also allows battery modules BM of different chemistries and different aging conditions to be easily integrated into the same energy storage system.

Figure 7A:
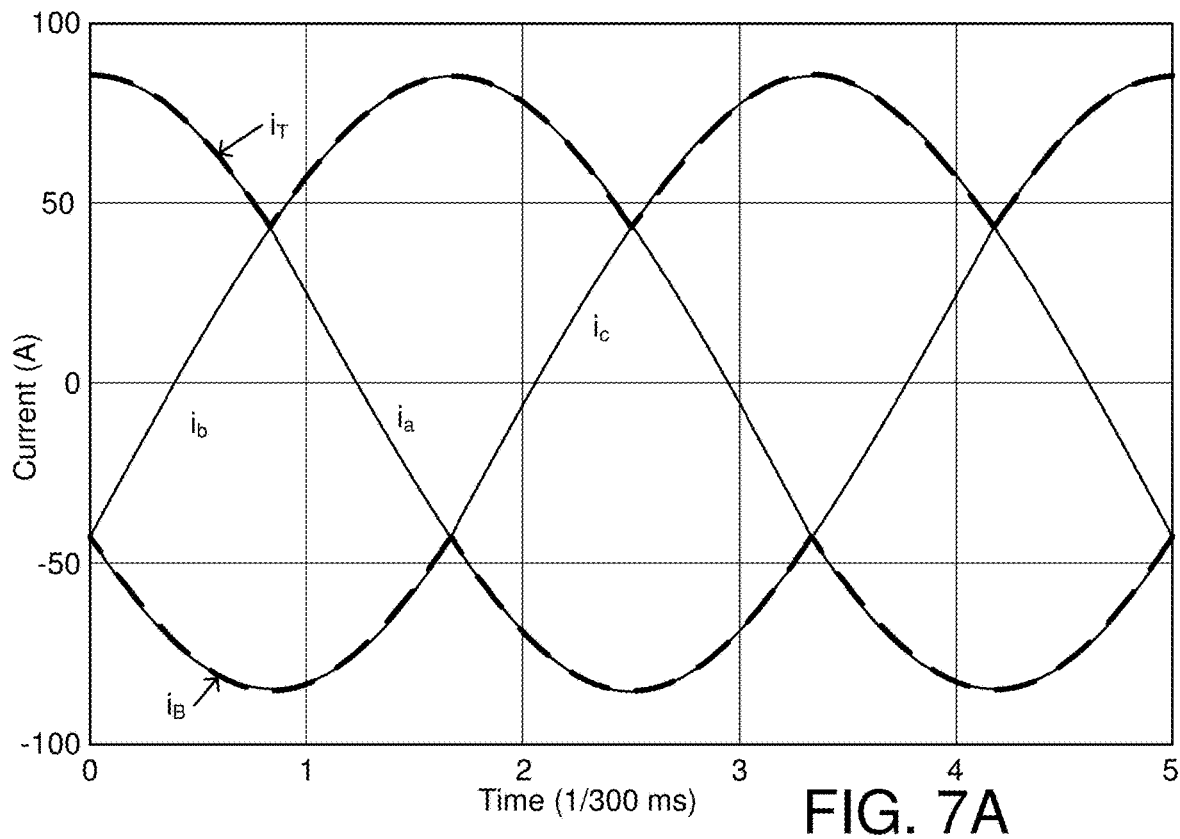
FIG. 7A is an illustration of one embodiment of simulated waveforms of phase currents and DC-link currents for an unfolder.
Figure 7B:
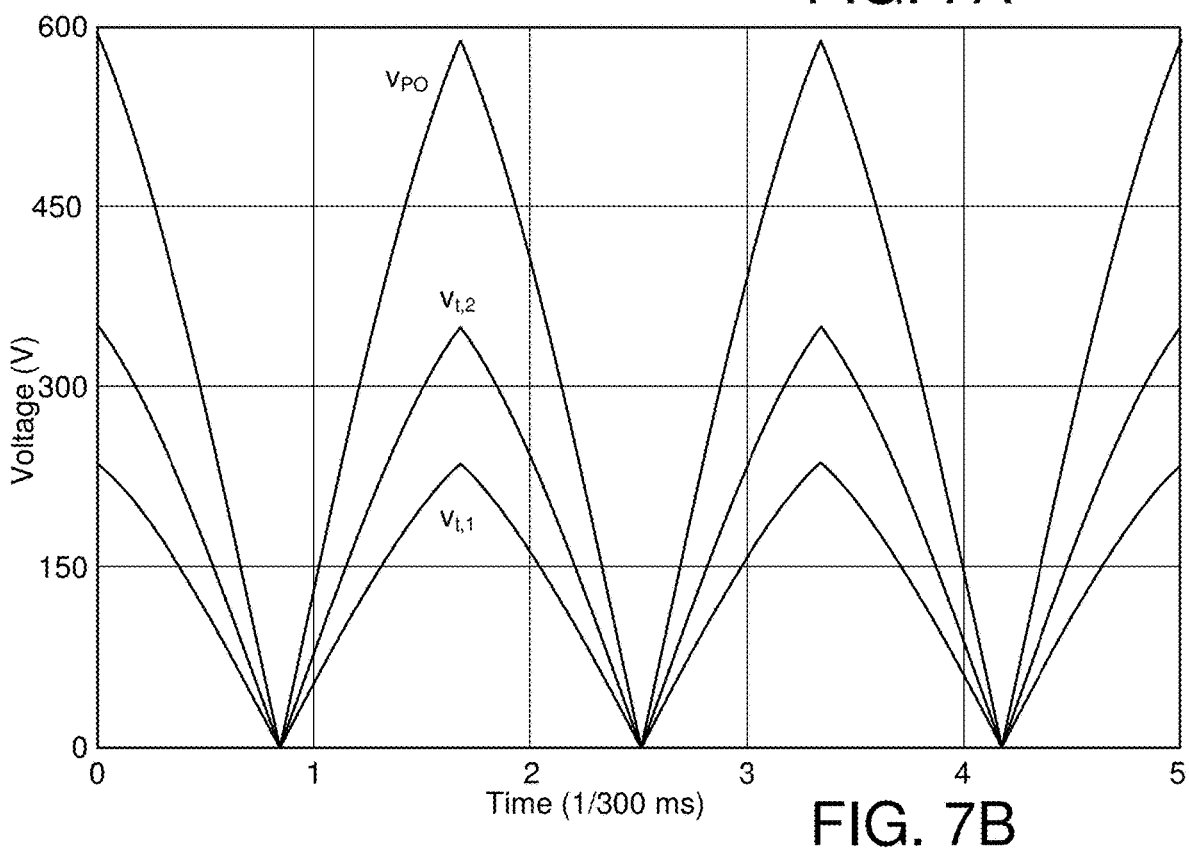
FIG. 7B is an illustration of one embodiment of simulated waveforms of a DC-link voltage and output voltages of two converter modules connected in series.

FIG. 7A is an illustration of one embodiment of simulated waveforms of phase currents $i_a$, $i_b$, $i_c$ and DC-link currents $i_T$, $i_B$ for an unfolder 106 and FIG. 7B is an illustration of one embodiment of simulated waveforms of a DC-link voltage $v_{PO}$ and output voltages $v_{t,11}$, $v_{t,21}$ of two converter modules CM-11, CM-21 connected in series. FIGS. 7A and 7B are simulations of a MMFC apparatus 100 using two converter modules CM-11, CM-21 that are connected in series. The simulations were used to analyze and control the power output of each converter module. Two bidirectional converters BC in the form of two DABSRCs were replaced with a controllable current source with its output capacitor. The input, u, to the current source, $i_u$, is derived from a second order actuator model which is a function of the converter DC gain, transformer turns ratio, $n_T$, and input, $v_{in}$, and output voltage, $v_o$, as given by $$\frac{i_u}{u} \approx k_u \frac{\omega_u^2}{s^2 + 2\xi_u \omega_u s + \omega_u^2} \quad (4)$$

where the DC gain $k_u$ is a non-linear function of $$M = \frac{v_0}{n_T v_{in}}$$

and u. The unfolder 106 is connected to a passive 3-phase load 108 comprising, for example, three resistors of 4.6Ω each and connected in a star configuration. In the absence of a grid voltage, the DC-link voltage is controlled and the unfolder 106 is used to formulate the grid voltage. FIG. 7A shows three-phase currents $i_a$, $i_b$, $i_c$ and DC-link currents $i_T$, $i_B$. Each phase carries a RMS current of 60 A which is equivalent to total power of 50 kW delivered to the three-phase load 108. Both the converter modules CM-11, CM-21 in a series string carry the same DC-link current $i_T$, and, therefore, the output voltage of the converter modules CM-11, CM-21 regulates the output power. Because DC-link voltage is not constant, output voltages $v_{t,11}$, $v_{t,21}$ of the two converter modules CM-11, CM-21 shown in FIG. 7B are controlled to be a fraction of the total DC-link voltage $v_{PO}$. The difference in the peak values of two voltages $v_{t,11}$, $v_{t,21}$ results in controlled difference in the output power of converter modules CM-11, CM-21. With a fixed DC-link voltage $v_{PO}$, the output voltage of two converter modules CM-11, CM-21 will be constant with an offset in their average voltages. This technique may be used for balancing the state-of-charge of battery modules BM.

Figure 8:
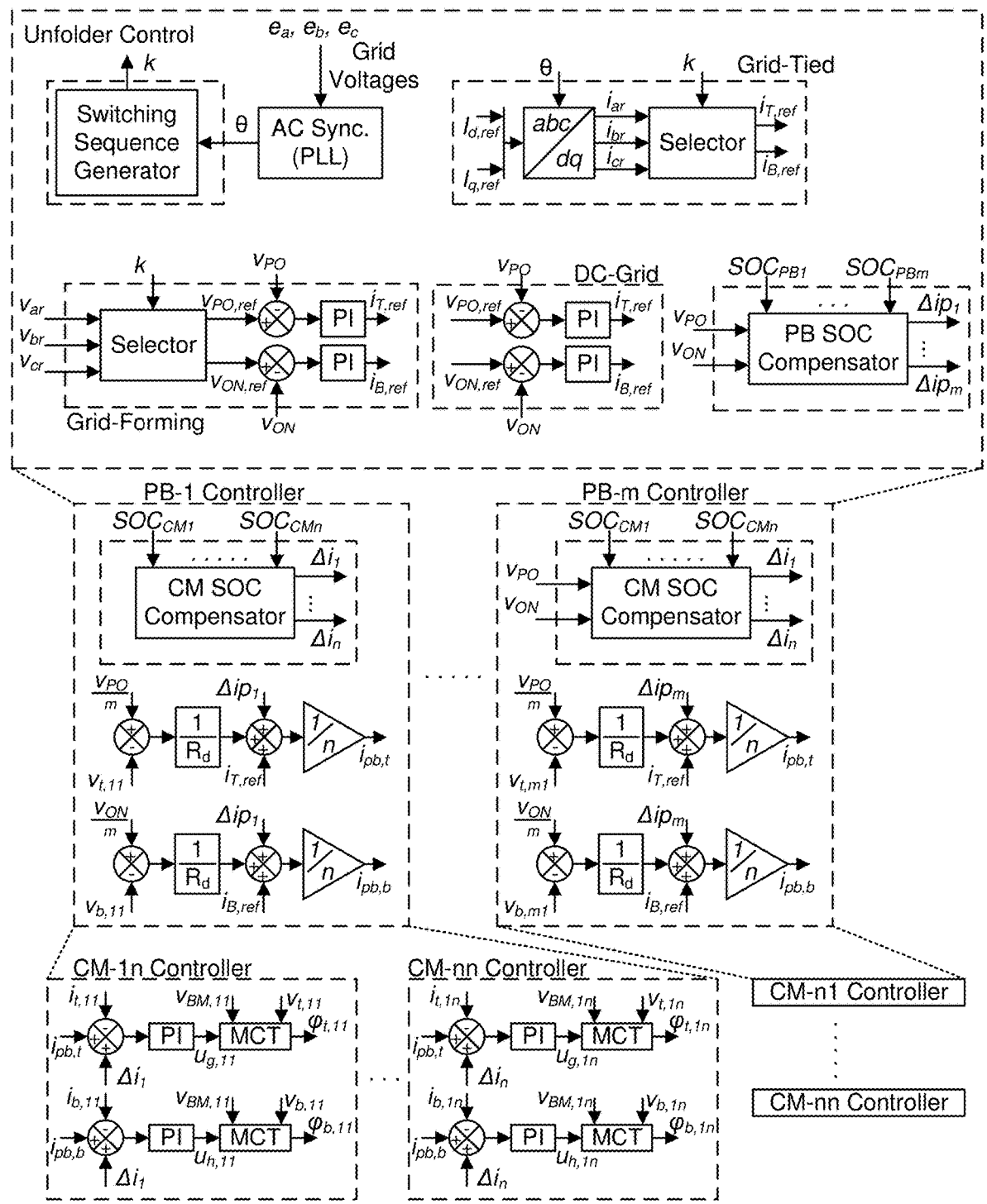
FIG. 8 is a schematic block diagram illustrating one embodiment of a controller for a multifunction converter ("MMFC")

FIG. 8 is a schematic block diagram illustrating one embodiment of a controller for a MMFC apparatus 100. The overall control scheme shown in FIG. 8 is organized into three levels. An MMFC controller (first level) regulates bidirectional power transfer with a DC or AC grid and sends appropriate signals to each power block PB controller (second level) regulating voltage and average SOC of all bower blocks PBs. Each power block PB controller communicates with n converter module CM controllers (third level) regulating SOC of a battery module BM and output current output of a converter module CM. In some embodiments, the MMFC controller, power block PB controllers, and converter module CM controllers incorporate the functions of the the DC-link controller 102 and the state-of-charge controller 104.

MMFC Controller: In some embodiments, the converter may operate in three modes: grid-tied, off-grid or grid-forming and DC-grid. With the grid-tied mode, the primary objective of the scheme is to control both real and reactive power exchanged with the grid. In this mode, the control scheme, as detailed above, is used to generate DC-link current references, $i_{T,ref}$ and $i_{B,ref}$. For off-grid applications, an angle of the grid is generated and DC-link currents $i_T$, $i_B$ are controlled such that appropriate DC-link voltages, $v_{PO}$ and $v_{ON}$, are synthesized. Three-phase AC voltages $v_{ab}$, $v_{bc}$, $v_{ca}$ are then constructed using an unfolder 106. For DC-grid applications, DC-link voltages $v_{PO}$, $v_{ON}$ are compared to their reference values $v_{PO,ref}$, $v_{ON,ref}$ and a proportional-integral controller PI is used to generate reference for the DC link currents $i_{T,ref}$, $i_{B,ref}$. In each mode, the DC-link current references $i_{T,ref}$, $i_{B,ref}$ are then broadcast to all the PB controllers.

In some embodiments, the SOC of the battery modules BMs are approximately controlled to a common value, otherwise the power output of the MMFC apparatus 100 would be limited by the battery module BM whose SOC reaches its limits. The MMFC controller, in some embodiments, incorporates a slow control loop to monitor an average SOC of all the power blocks PBs. The SOC compensator creates a time varying current reference, $\Delta ip_k$, k$\varepsilon$ $\{1, \ldots, m\}$, resulting in delta voltage variation, $\Delta v_k$, such that $\Sigma_{k=1}^{m} \Delta v_k = 0$, in the output voltage of each power block PB. Since current through the series connected power blocks PBs is the same, the delta variation modifies the actual output power of each power block PB, and, as a result, output power of battery modules BMs. Because the sum of all the voltages of the series connected power blocks PBs is equal to the total DC-link voltage $v_{PO}$, $v_{ON}$, the total output power is not affected.

PB Controller:

This controller balances SOC of all the battery modules BMs in a power block PB by manipulating the output current of each converter module CM. With this loop, SOC of all the battery modules BMs is assessed and a corrective term, $\Delta i_k$, k$\varepsilon$ $\{1, \ldots, n\}$ such that $\Sigma_{k=1}^{n} \Delta i_k = 0$, is added to the current reference of each converter module CM. This term either reduces or increases the converter module CM current and, as a result, power supplied by a battery module BM. Since the sum of all the terms is zero, the final output current of a power block PB is not affected. Because of the slow dynamics of a battery module BM, the SOC balancing, in some embodiments, is implemented using a slow control loop.

With a series connection of power blocks PBs, the output voltage of a power block PB might diverge from its nominal value due to some transients, tolerances of component values, and other unknown asymmetries. Therefore, the DC-link voltage is shared equally among the power blocks BMs, unless a delta voltage variation is requested by the MMFC controller. DC-link voltages $v_{PO}$, $v_{ON}$ are measured and a droop control scheme may then be used to regulate output voltage of each power block PB. In some embodiments, the output of a droop controller is translated into a current value using a droop resistance and then added to the current reference of a power block PB.

CM Controller:

Each converter module CM, in some embodiments, has its own current controller (with a response time in the range of 10 μs) that is regulating output current of the converter module CM. This converter module CM loop measures voltage of both the battery BM and converter module CM, and, in some embodiments, uses an MCT algorithm to determine switching angles of a DASBRC with which inner converter or tank current and, as a result, switching losses are minimized. The algorithm was successfully tested for a single converter module CM. In some embodiments, because of the fast response time, this control loop may be implemented in a FPGA. This controller may also evaluate SOC of a battery module BM using its equivalent circuit models and may transmit the SOC value to a power block PB. Since SOC varies more slowly than voltage and current of a battery BM, an accurate estimation of SOC may be obtained by measuring and averaging both voltage and current over a number of sampling intervals. The measured and averaged values may be based on the resolution of the voltage and current sensors, and the choice of sampling time. Challenges associated with digital design of this control loop may be addressed by stabilizing the control loop operating with non-idealities such as control and measurement delays, and non-idealities of the circuit including operating near resonance frequency of the tank network.

A converter module CM was modelled to understand dynamics of various voltages and currents. The model was used to develop control algorithms, control converter response during transients, and analyze stability of the overall controller. Previous work with the dynamic phasor transform for small signal modeling of a DABSRC was extended for this converter topology.

With a phasor transform, switching frequency components of the voltage and currents waveforms are removed while maintaining their sinusoidal envelope. Considering the DABSRC circuit shown in FIG. 2A, the voltage phasor of the primary voltage $v_{AB}$ is $$\bar{v}_{AB} = \frac{4V_{BM,11}}{\pi} \sin\left(\frac{\varphi_{AB}}{2}\right) e^{-j\frac{\varphi_{AB}}{2}}, \tag{5}$$

where $\varphi_{AB}$ is the phase angle of the primary H-bridge. By taking partial derivatives of $\bar{v}_{AB}$ with respect to perturbations in $\varphi_{AB}$, $\varphi_{AD}$ and $\varphi_{DC}$, result in the steady-state and small signal model of $\bar{v}_{AB}$ to be expressed as $$\bar{v}_{AB} \approx \bar{V}_{AB}(\Phi_{AB}) + \bar{v}_{AB}{}^{ab}\hat{\varphi}_{ab} \tag{6}$$

Following a similar process, the linear steady-state and small signal model of the secondary side bridge can be derived as $$\bar{v}_{DC} \approx \bar{V}_{DC}(\Phi_{AD}, \varphi_{DC}) + \bar{v}_{DC}{}^{ad}\hat{\varphi}_{ad} + \bar{v}_{DC}{}^{dc}\hat{\varphi}_{dc} \tag{7}$$

Figure 9:
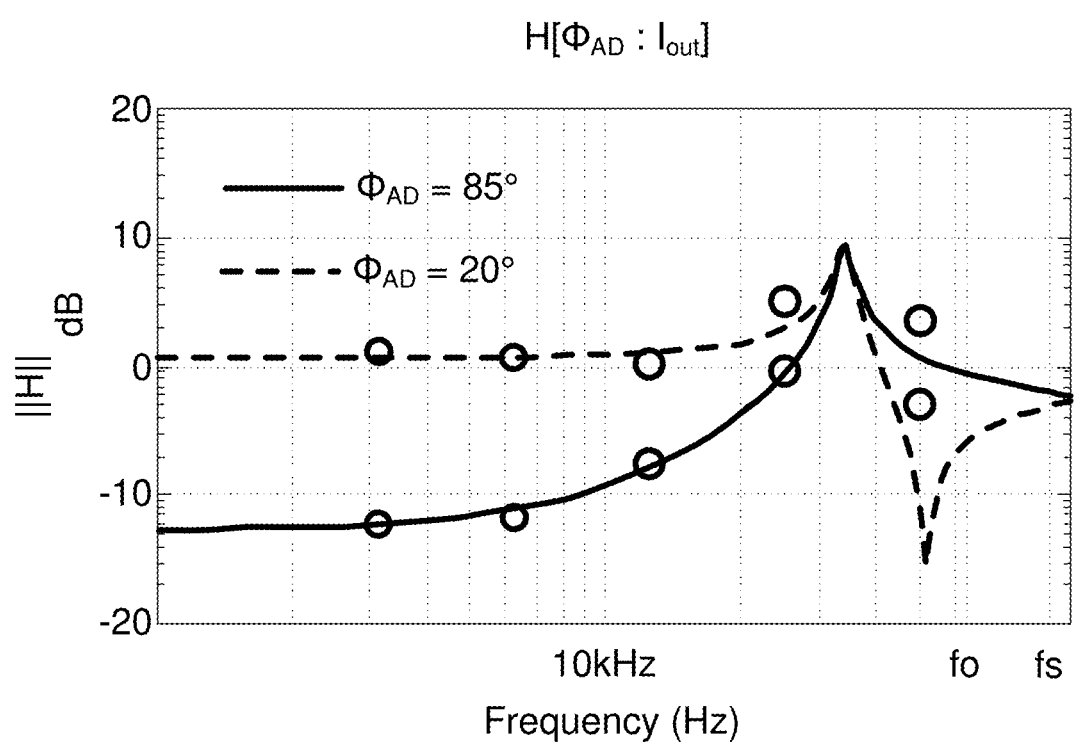
FIG. 9 is a bode plot of a transfer function of $\varphi_{AD}$ to output current at two operating points.

Previous work derived a transfer function from control to output current, and from control to input current. As an example, the bode plots of transfer function from $\varphi_{AD}$ to output current at two different operating points are plotted in FIG. 9, with a comparison of experimental measurements superimposed as circles. There is good agreement in between the theoretical and experimental results, and this theoretical analysis may be used in deriving the small signal input impedance model of each converter module CM.

A transfer function of each converter module CM may be obtained using the small signal model, and the function may be used to derive an impedance model of the complete MMFC apparatus 100 and to analyze the stability of the control loops. The developed model may also be used to analyze how the currents and voltages of the grid and PBs are affected by each other. This also helps in selecting maximum values of delta voltage and current variations as needed for SOC balancing. Furthermore, a time domain state space models may also be developed to analyze harmonics of the battery current. These developed models may also be used to estimate the state of DC-link and power block PB voltages, and these estimations when used with the control loops help to reduce the number of measurements and external sensors.

Figure 10:
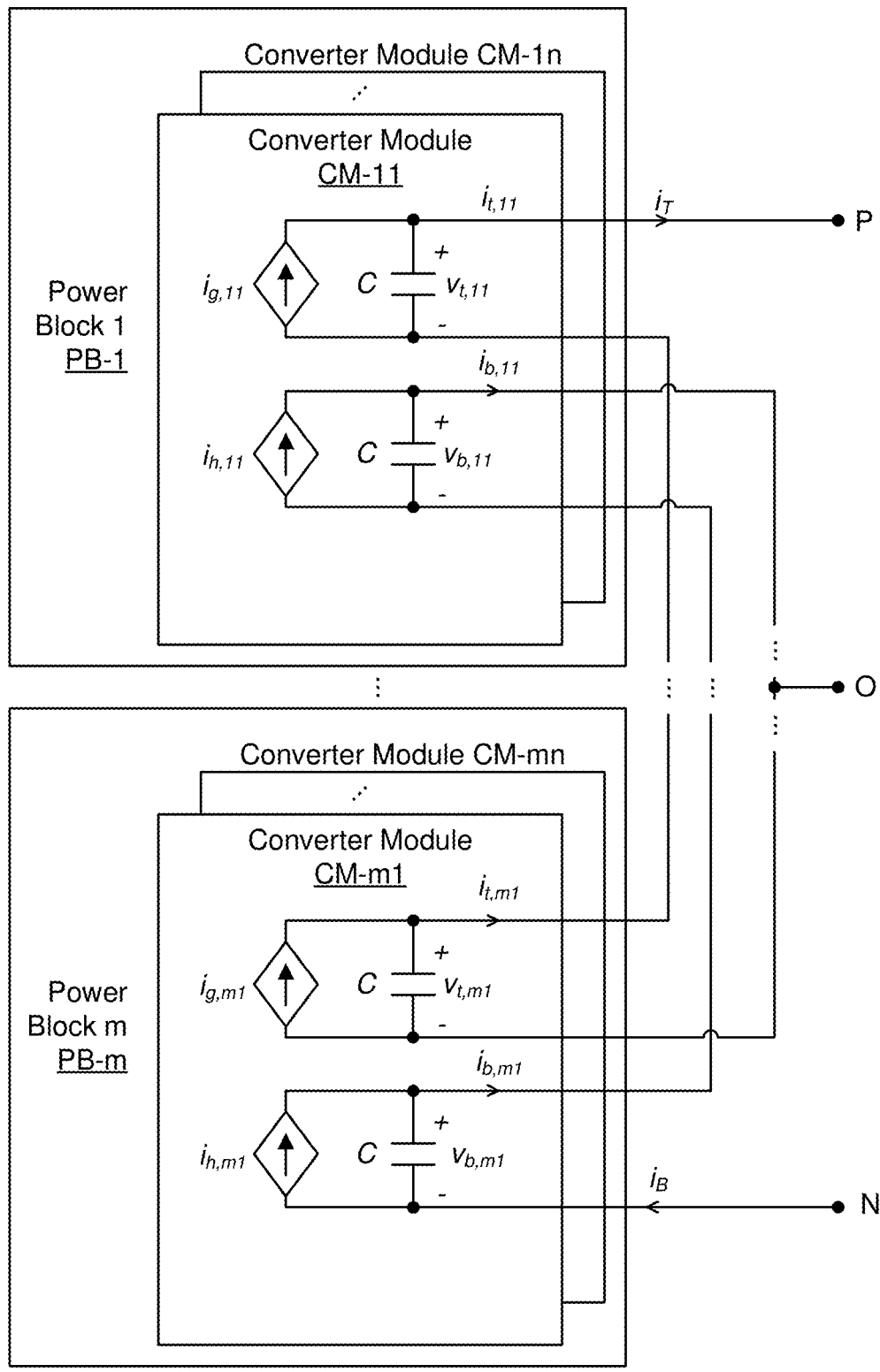
FIG. 10 is a schematic block diagram illustrating an equivalent circuit module of the MMFC apparatus of FIG. 1.

A circuit analysis was carried out and was used to develop an equivalent circuit of the MMFC apparatus 100, shown in FIG. 10. Each DABSRC is modelled as a controllable current source. The output current of each converter module CM, $i_{a,bc}$, a$\varepsilon$$\{t, b\}$, b$\varepsilon$$\{1, \ldots, m\}$, c$\varepsilon$$\{1, \ldots, n\}$, can be related to output current of a power block PB, $i_r$, r$\varepsilon$$\{T, B\}$, as $$i_T = \Sigma_{k=1}^{n} i_{t,1k} = \ldots = \Sigma_{k=1}^{n} i_{t,mk} \tag{8}$$

$$i_B = \Sigma_{k=1}^{n} i_{b,1k} = \ldots = \Sigma_{k=1}^{n} i_{b,mk} \tag{9}$$

The output voltage, $v_{a,bc}$ of all the DABSRCs in a power block PB is equal and is given by $$v_{t,m1}=v_{t,m2}=\ldots=v_{t,mn} \quad (10)$$

$$v_{b,m1}=v_{b,m2}=\ldots=v_{b,mn} \quad (11)$$

The DC-link voltages $v_{PO}$ and $v_{ON}$ are a sum of the output voltages of all the PBs $$v_{PO}=\Sigma_{k=1}^{m}v_{t,k1} \text{ and } v_{ON}=\Sigma_{k=1}^{m}v_{b,k1} \quad (12)$$

It is apparent from equations (5) and (6) that output current of each CM in a PB can be controlled to be different from others without affecting their total sum. Since voltage across each converter CM in equations (7) and (8) is the same, the different values of current determine the power output of a battery module BM. Similarly, the voltage across each power block PB can be different from equation (9) without compromising the DC-link voltage, and therefore power output of power blocks PBs can be controlled by their output voltages. These two degrees of freedom, in one embodiment, are the basis of the overall control scheme of FIG. 8 for balancing the SOC of all the battery modules BMs.

A lab scale 1.2 kVA prototype CM was also constructed for demonstrating the feasibility of the proposed control scheme and the concept. The input to the converter module CM was connected to both a constant voltage source and an electronic load for verifying the bidirectional power transfer capabilities. The AC outputs of the unfolder were connected to a bidirectional AC source.

Figure 11:
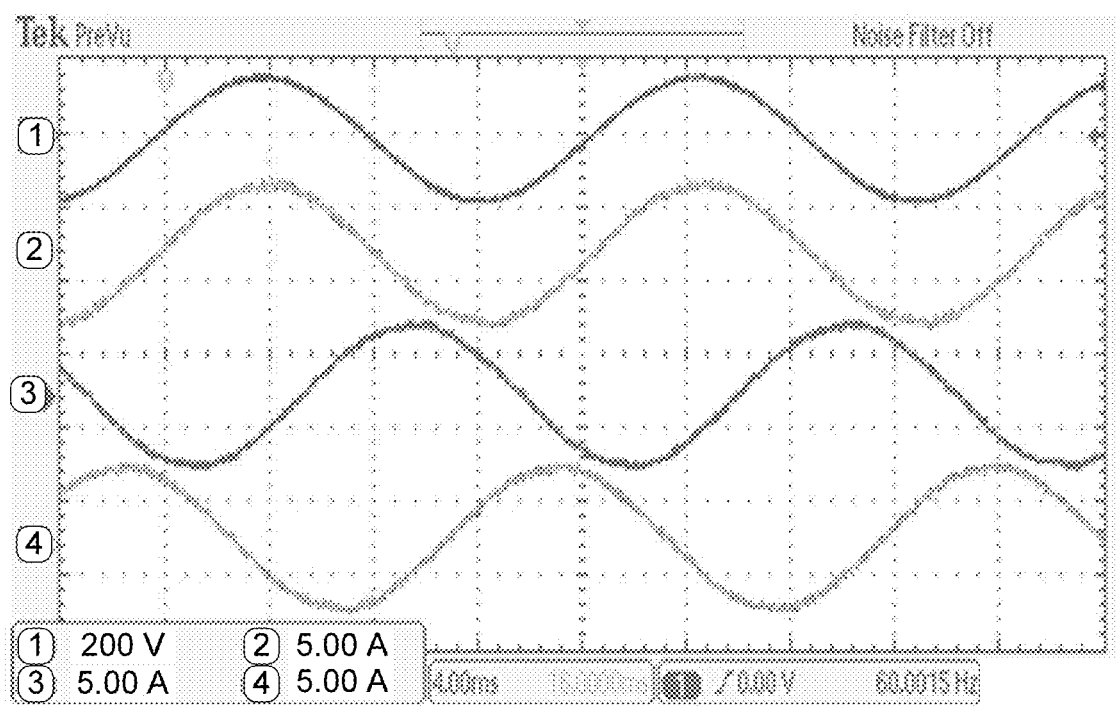
FIG. 11 are test results for a hardware version of the converter module circuit.
Figure 12:
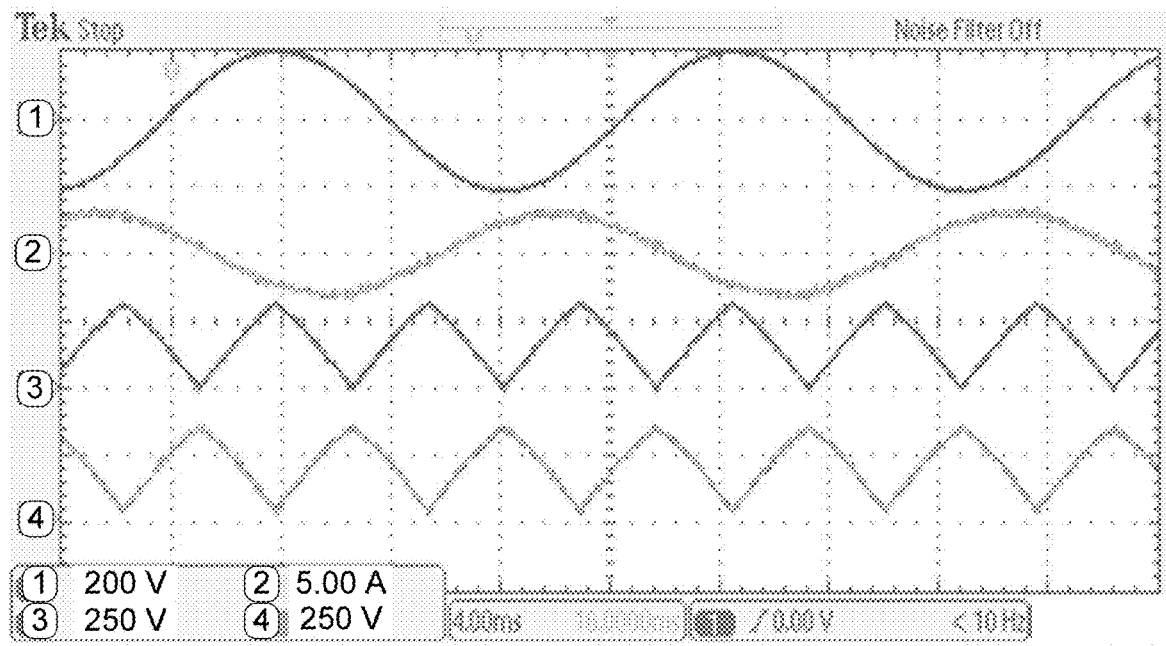
FIG. 12 are additional test results for the hardware version of the converter module circuit.

Experimental waveforms of the voltages and currents at a unity power factor when the converter delivers 1.2-kW to the grid are shown in FIG. 11. The line-line voltage is 208 V RMS, and DC voltage is 500 V. The total harmonic distortion ("THD") of the phase current is 2.5%. Channel 1 shows phase-a line-neutral voltage, and channel 2-4 show all three phase currents. Experiments were also performed such that the converter module CM receives 0.7 kW and 0.7 kVAr from grid at a power factor PF=0.7. In this case the line-line voltage is 260 V RMS, and DC voltage is 400 V. The THD of the phase current is 4%. As shown in FIG. 12, Channel 1 shows phase-a line-neutral voltage and channel 2 shows phase-a current. Channels 3 and 4 show top and bottom DC-link voltages, respectively.

The results clearly demonstrate bidirectional power transfer capability of a converter module CM while controlling both real and reactive power. The MMFC apparatus 100 may, therefore, be used for storing energy and supporting the grid as needed. Unlike conventional pulse-width modulation ("PWM") converters, the distortion in the DC-link currents and voltages is significantly lower. The currents are well regulated even with a non-unity power factor, and THD of the phase currents is very low, which promotes operation of the MMFC apparatus 100 without filters. As shown in FIG. 11, the voltage isolation is inherent to each converter module CM, and the application of a high frequency transformer reduces the footprint of the MMFC apparatus 100 in comparison to typical converters that use low frequency transformers for isolation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a plurality of power blocks, each power block comprising one or more converter modules, each converter module comprising a positive bidirectional converter, a negative bidirectional converter, and a battery module, a first side of the positive and negative bidirectional converters of a converter module connected in parallel to the battery module of the converter module, a second side of the positive and negative bidirectional converters of each converter module connected in parallel, wherein the paralleled positive bidirectional converters of each power block are connected in series between a positive connection and a neutral connection and wherein the paralleled negative bidirectional converters of each power block are connected in series between the neutral connection and a negative connection;
a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference; and
a state-of-charge controller that controls a ratio of power supplied by each power block and a ratio of power supplied by each converter module within a power block based on a target state-of-charge for each battery module.

2. The apparatus of claim 1, further comprising an unfolder connected to the positive connection, the negative connection, and the neutral connection, the unfolder providing a three-phase output and converting power from the power blocks to three-phase alternating current ("AC") output power at output terminals of the unfolder for connection to a three-phase load.

3. The apparatus of claim 2, wherein the DC-link controller is programmable to control the positive output voltage to produce a triangular output waveform and the negative output voltage to produce triangular output waveform, wherein the unfolder converts the triangular output waveforms to produce low harmonic three-phase sinusoidal output waveforms.

4. The apparatus of claim 3, wherein each triangular output waveform is a quasi-triangular waveform shaped to minimize harmonics of the three-phase sinusoidal output waveforms of the unfolder.

5. The apparatus of claim 2, wherein the unfolder is bidirectional and comprises one of a neutral point clamp converter and a diode clamp converter.

6. The apparatus of claim 2, wherein the three-phase load sinks and sources power.

7. The apparatus of claim 2, wherein the neutral connection of the plurality of power blocks is common with a neutral connection of the unfolder and the neutral connection is isolated from each battery module.

8. The apparatus of claim 2, wherein one or more loads are connected to one or more of the output terminals of the unfolder and the positive, neutral and negative connections and wherein the DC-link controller determines voltage requirements of the one or more loads and selects a direct current ("DC") output voltage control scheme or an AC output voltage control scheme to match voltage requirements of the load.

9. The apparatus of claim 1, wherein each battery module comprises one or more battery cells connected together and wherein the state-of-charge controller adjusts power provided by and to each battery module according to a target state-of-charge for the battery module that considers health of each battery module.

10. The apparatus of claim 9, wherein the battery modules are connected together to form a battery and the battery is connected to one or more of a charging circuit and a load.

11. The apparatus of claim 1, wherein each bidirectional converter comprises a bidirectional switchmode power converter, wherein each converter module provides electrical isolation between the battery module of the converter module and output connections of the converter module.

12. The apparatus of claim 11, wherein the bidirectional switchmode power converter comprises one of a dual active bridge series resonant converter ("DABSRC") and a three-port series resonant converter ("3PSRC").

13. The apparatus of claim 12, wherein each DABSRC or 3PSRC operates in a zero-voltage switching ("ZVS") mode.

14. The apparatus of claim 1, wherein the DC-link controller is programmable to control the positive output voltage to a constant voltage and to control the negative output voltage to a constant voltage, wherein the positive connection, neutral connection and negative connection feed a DC load.

15. The apparatus of claim 1, wherein the output voltages of a power block of the plurality of power blocks differ from the output voltages of other power blocks of the plurality of power blocks.

16. An apparatus comprising:
  a plurality of power blocks, each power block comprising one or more converter modules, each converter module comprising a positive bidirectional converter, a negative bidirectional converter, and a battery module, a first side of the positive and negative bidirectional converters of a converter module connected in parallel to the battery module of the converter module, a second side of the positive and negative bidirectional converters of each converter module connected in parallel, wherein the paralleled positive bidirectional converters of each power block are connected in series between a positive connection and a neutral connection and wherein the paralleled negative bidirectional converters of each power block are connected in series between the neutral connection and a negative connection;
  a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference;
  a state-of-charge controller that controls a ratio of power supplied by each power block and a ratio of power supplied by each converter module within a power block based on a target state-of-charge for each battery module; and
  an unfolder connected to the positive connection, the negative connection, and the neutral connection, the unfolder providing a three-phase output and converting power from the power blocks to three-phase alternating current ("AC") output power at output terminals of the unfolder for connection to a three-phase load,
  wherein the DC-link controller is programmable to control the positive output voltage to produce a triangular output waveform and the negative output voltage to produce triangular output waveform usable by the unfolder to produce three-phase output power for a load connected to the unfolder, and
  wherein the DC-link controller is programmable to control the positive output voltage and the negative output voltage to voltages suitable for a load connected to the positive, negative and neutral connections.

17. The apparatus of claim 16, wherein when the DC-link controller is programmed for a load connected to the positive, negative and neutral connections, an unfolder controller adapts control of switches of the unfolder to produce three-phase output power to a load connected to the unfolder.

18. The apparatus of claim 16, wherein each battery module comprises one or more battery cells connected together and wherein the state-of-charge controller adjusts power provided by and to each battery module according to a target state-of-charge for the battery module that considers health of each battery module.

19. The apparatus of claim 16, wherein each bidirectional converter comprises one of a dual active bridge series resonant converter ("DABSRC") and three-port series resonant converter ("3PSRC") and wherein each converter module provides electrical isolation between the battery module of the converter module and output connections of the converter module.

20. An apparatus comprising:
  a plurality of power blocks, each power block comprising one or more converter modules, each converter module comprising a positive bidirectional converter, a negative bidirectional converter, and a battery module, each bidirectional converter comprising a dual active bridge series resonant converter ("DABSRC"), a first side of the positive and negative bidirectional converters of a converter module connected in parallel to the battery module of the converter module, a second side of the positive and negative bidirectional converters of each converter module connected in parallel, wherein the paralleled positive bidirectional converters of each power block are connected in series between a positive connection and a neutral connection and wherein the paralleled negative bidirectional converters of each power block are connected in series between the neutral connection and a negative connection;
  a DC-link controller that controls, by varying current through the plurality of power blocks, a positive output voltage between the positive connection and the neutral connection to follow a positive voltage reference and controls a negative output voltage between the neutral connection and the negative connection to follow a negative voltage reference;
  a state-of-charge controller that controls a ratio of power supplied by each power block and a ratio of power supplied by each converter module within a power block based on a target state-of-charge for each battery module; and
  an unfolder connected to the positive connection, the negative connection, and the neutral connection, the unfolder providing a three-phase output and converting power from the power blocks to three-phase alternating current ("AC") output power at output terminals of the unfolder for connection to a three-phase load,
  wherein the DC-link controller is programmable to control the positive output voltage to produce a triangular output waveform and the negative output voltage to produce triangular output waveform usable by the unfolder to produce three-phase output power for a load connected to the unfolder,
  wherein each battery module comprises one or more battery cells, wherein the one or more battery cells of a battery module are connected together and wherein each converter module provides electrical isolation between the battery module of the converter module and output connections of the converter module.

* * * * *